US009544271B2

(12) United States Patent
McFarland et al.

(10) Patent No.: US 9,544,271 B2
(45) Date of Patent: Jan. 10, 2017

(54) ANONYMOUS MESSAGING CONVERSATION

(75) Inventors: Keith McFarland, Annapolis, MD (US); Vishal Jain, Annapolis, MD (US)

(73) Assignee: Telecommunication Systems, Inc., Annapolis, MD (US)

(*) Notice: Subject to any disclaimer, the term of this patent is extended or adjusted under 35 U.S.C. 154(b) by 0 days.

(21) Appl. No.: 13/610,246

(22) Filed: Sep. 11, 2012

(65) Prior Publication Data

US 2013/0070672 A1 Mar. 21, 2013

Related U.S. Application Data

(60) Provisional application No. 61/573,162, filed on Sep. 16, 2011, provisional application No. 61/543,470, (Continued)

(51) Int. Cl.
*H04W 4/00* (2009.01)
*H04L 29/12* (2006.01)
(Continued)

(52) U.S. Cl.
CPC ........... *H04L 61/2539* (2013.01); *H04L 51/28* (2013.01); *H04L 61/2525* (2013.01);
(Continued)

(58) Field of Classification Search
CPC ........... H04L 29/12433; H04L 61/2539; H04L 51/02; H04L 51/38; H04L 51/066; H04L 63/0414
See application file for complete search history.

(56) References Cited

U.S. PATENT DOCUMENTS

| 3,400,222 A | 9/1968 | Nightingale |
| 4,910,767 A | 3/1990 | Brugliera |

(Continued)

FOREIGN PATENT DOCUMENTS

| EP | 1030531 | 8/2000 |
| WO | WO97/41654 | 11/1997 |

(Continued)

OTHER PUBLICATIONS

"Technology Rides Control Network to Support Short Package Applications"; Advanced Intelligent Network New. Washington, DC: Mar. 19, 1997. vol. 7, Iss. 6; p. 1.

(Continued)

*Primary Examiner* — Edan Orgad
*Assistant Examiner* — Rebecca Song
(74) *Attorney, Agent, or Firm* — Tarolli, Sundheim, Covell & Tummino LLP (57) ABSTRACT

An anonymous communication module that provides full conversational anonymous messaging and voice/video communication between two or more parties interacting over a wireless/landline network. An anonymous messaging module accepts an anonymous initiation message to a public address to trigger the start of an anonymous voice/video conversation between a message originator and a message recipient. An anonymous communication module performs intercept and address substitution on a message and/or voice/video call transmitted between two or more parties via an anonymous communication service. The anonymous communication module substitutes a real address in the source field of an intercepted message and/or voice/video call, with an anonymous address mapped to that real address, and substitutes an anonymous address in the destination field of an intercepted message and/or voice/video call with a real address mapped to that anonymous address.

(Continued)

The anonymous communication module then forwards the newly formatted message and/or voice/video call to an intended message/call destination.

13 Claims, 5 Drawing Sheets

Related U.S. Application Data filed on Oct. 5, 2011, provisional application No. 61/547,244, filed on Oct. 14, 2011.

(51) Int. Cl.
*H04L 12/58* (2006.01)
*H04L 29/06* (2006.01)
*H04W 4/12* (2009.01)

(52) U.S. Cl.
CPC ...... *H04L 63/0421* (2013.01); *H04L 65/1069* (2013.01); *H04L 65/1073* (2013.01); *H04W 4/12* (2013.01)

(56) References Cited

U.S. PATENT DOCUMENTS

| | | | |
|---|---|---|---|
| 5,430,759 | A | 7/1995 | Yokev |
| 5,825,283 | A | 10/1998 | Camhi |
| 6,026,292 | A | 2/2000 | Coppinger |
| 6,073,004 | A | 6/2000 | Balachandran |
| 6,073,015 | A | 6/2000 | Berggren |
| 6,131,028 | A | 10/2000 | Whitington |
| 6,175,619 | B1 | 1/2001 | DeSimone |
| 6,240,295 | B1 | 5/2001 | Kennedy, III |
| 6,373,930 | B1 | 4/2002 | McConnell |
| 6,456,852 | B2 | 9/2002 | Bar |
| 6,473,622 | B1 | 10/2002 | Meuronen |
| 6,512,930 | B2 | 1/2003 | Sandegren |
| 6,526,335 | B1 | 2/2003 | Treyz et al. |
| 6,529,722 | B1 | 3/2003 | Heinrich |
| 6,560,456 | B1 | 5/2003 | Lohita |
| 6,728,353 | B1 | 4/2004 | Espejo |
| 6,731,943 | B1 | 5/2004 | McCormick |
| 6,744,858 | B1 | 6/2004 | Ryan |
| 6,816,580 | B2 | 11/2004 | Timmins |
| 6,868,074 | B1 | 3/2005 | Hanson |
| 6,915,138 | B2 | 7/2005 | Kraft |
| 6,993,325 | B1 | 1/2006 | Waesterlid |
| 7,020,480 | B2 | 3/2006 | Coskun |
| 7,106,717 | B2 | 9/2006 | Rousseau |
| 7,110,773 | B1 | 9/2006 | Wallace |
| 7,120,418 | B2 | 10/2006 | Herajarvi |
| 7,127,264 | B2 | 10/2006 | Hronek |
| 7,130,383 | B2 | 10/2006 | Naidoo et al. |
| 7,145,462 | B2 | 12/2006 | Dewing |
| 7,180,415 | B2 | 2/2007 | Banker et al. |
| 7,245,216 | B2 | 7/2007 | Burkley |
| 7,317,705 | B2 | 1/2008 | Hanson |
| 7,328,031 | B2 | 2/2008 | Kraft |
| 7,356,328 | B1 | 4/2008 | Espejo |
| 7,366,157 | B1 | 4/2008 | Valentine |
| 7,386,588 | B2 | 6/2008 | Mousseau |
| 7,437,348 | B1 | 10/2008 | Wyett |
| 7,826,818 | B2 | 11/2010 | Gollnick |
| 2001/0006889 | A1 | 7/2001 | Kraft |
| 2001/0034224 | A1 | 10/2001 | McDowell |
| 2001/0049274 | A1 | 12/2001 | Degraeve |
| 2002/0156732 | A1 | 10/2002 | Odjik |
| 2002/0181681 | A1 | 12/2002 | Mani |
| 2003/0003909 | A1 | 1/2003 | Keronen |
| 2003/0058096 | A1 | 3/2003 | Shteyn |
| 2003/0125042 | A1 | 7/2003 | Olrik |
| 2003/0147537 | A1 | 8/2003 | Jing et al. |
| 2003/0186709 | A1 | 10/2003 | Rhodes |
| 2003/0186710 | A1 | 10/2003 | Muhonen |
| 2003/0200334 | A1* | 10/2003 | Grynberg ............ G06Q 20/383 709/245 |
| 2004/0103431 | A1 | 5/2004 | Davenport |
| 2004/0137921 | A1 | 7/2004 | Valloppillil |
| 2004/0176123 | A1 | 9/2004 | Chin |
| 2004/0199614 | A1 | 10/2004 | Shenfield |
| 2004/0203900 | A1 | 10/2004 | Cedervall |
| 2004/0203922 | A1 | 10/2004 | Hines |
| 2004/0225878 | A1 | 11/2004 | Costa-Requena |
| 2004/0235493 | A1 | 11/2004 | Ekerborn |
| 2005/0003803 | A1 | 1/2005 | Buckley |
| 2005/0020287 | A1 | 1/2005 | Pohutsky |
| 2005/0101338 | A1 | 5/2005 | Kraft |
| 2005/0135569 | A1 | 6/2005 | Dickinson |
| 2005/0176445 | A1 | 8/2005 | Qu |
| 2005/0201528 | A1 | 9/2005 | Meer |
| 2005/0243778 | A1 | 11/2005 | Wang |
| 2005/0261012 | A1 | 11/2005 | Weiser |
| 2005/0265536 | A1 | 12/2005 | Smith |
| 2005/0277432 | A1 | 12/2005 | Viana |
| 2005/0282518 | A1 | 12/2005 | D'Evelyn |
| 2005/0287990 | A1 | 12/2005 | Mononen |
| 2006/0020965 | A1 | 1/2006 | Steelberg |
| 2006/0028995 | A1 | 2/2006 | Canoy |
| 2006/0109960 | A1 | 5/2006 | D'Evelyn |
| 2006/0116138 | A1 | 6/2006 | Simsek |
| 2006/0183460 | A1 | 8/2006 | Srinivasan et al. |
| 2006/0223549 | A1 | 10/2006 | Chang |
| 2006/0242230 | A1 | 10/2006 | Smith |
| 2006/0276168 | A1 | 12/2006 | Fuller |
| 2007/0005969 | A1* | 1/2007 | Fullerton ................ 713/168 |
| 2007/0021098 | A1 | 1/2007 | Rhodes |
| 2007/0110076 | A1 | 5/2007 | Brouwer |
| 2007/0117574 | A1 | 5/2007 | Watanabe |
| 2007/0117577 | A1 | 5/2007 | Harris |
| 2007/0136132 | A1 | 6/2007 | Weiser |
| 2007/0149208 | A1 | 6/2007 | Syrbe |
| 2007/0253429 | A1 | 11/2007 | James |
| 2008/0014931 | A1 | 1/2008 | Yared |
| 2008/0192736 | A1* | 8/2008 | Jabri et al. ............... 370/352 |
| 2008/0235511 | A1 | 9/2008 | O'Brien |
| 2009/0003535 | A1 | 1/2009 | Grabelsky |
| 2009/0077245 | A1* | 3/2009 | Smelyansky et al. ........ 709/228 |
| 2009/0124270 | A1* | 5/2009 | Kelley ............... 455/466 |
| 2009/0221263 | A1 | 9/2009 | Titus |
| 2010/0076767 | A1 | 3/2010 | Vieri |
| 2010/0120412 | A1 | 5/2010 | Tang |
| 2010/0125892 | A1 | 5/2010 | Tanizawa |
| 2010/0161747 | A1* | 6/2010 | Rayan et al. ............ 709/206 |
| 2010/0311447 | A1 | 12/2010 | Jackson |
| 2011/0131414 | A1 | 6/2011 | Cheng |
| 2011/0307947 | A1 | 12/2011 | Kariv |

FOREIGN PATENT DOCUMENTS

| | | | |
|---|---|---|---|
| WO | WO/98/21913 | 5/1998 | |
| WO | WO/03/056853 | 7/2003 | |
| WO | WO2005/051033 | 6/2005 | |
| WO | WO2011/041967 A1 * | 4/2011 | ......... H04L 63/0407 |

OTHER PUBLICATIONS

Cellular Mobile Pricing Structures and Trends; Dr. Sam Paltridge of the OECD's Directorate for Science, Technology and Industry; Dist.: May 19, 2000 (Nov. 1999).

European Search Report in European Appl. No. 04778713.0-2412 dated Jul. 13, 2011.

47 code of federal regulations (Nov. 1, 2005 Edition).

Qualcomm CDMA Technologies, MS Resident User Plane LBS Roaming—80-VC718-1 E, 2006, pp. 1-37.

Nars Harran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, LBS Control Plane Overview—80-VD378-1NP B, 2006, pp. 1-36.

(56) References Cited

OTHER PUBLICATIONS

Bhalla et al., TELUS, Technology Strategy—LBS Roaming Summit, Sep. 19, 2006.
Alfredo Aguirre, Ilusacell, First and Only Carrier in Mexico with a 3G CDMA Network, 2007.
Mike McMullen, Sprint, LBS Roaming Summit, Sep. 9, 2006.
Andrew Yeow, BCE, LBS Roaming Summit, Sep. 19, 2006, pp. 1-8.
International Search Report received in PCT/US2012/00208 dated Jul. 6, 2012.
International Search Report received in PCT/US2012/068083 dated Feb. 8, 2013.
International Search Report received in PCT/US2012/21199 dated Mar. 26, 2013.

\* cited by examiner

ANONYMOUS MESSAGING CONVERSATION

The present invention claims priority from U.S. Application No. 61/543,470 to McFarland et al., entitled "Anonymous Messaging Conversation" filed Oct. 5, 2011; and from U.S. Provisional Application No. 61/573,162 to McFarland et al., entitled "Anonymous Messaging Conversation" filed Sep. 16, 2011; and from U.S. Provisional Application No. 61/547,244 to McFarland et al., entitled "Anonymous Messaging Conversation" filed Oct. 14, 2011, the entirety of which is expressly incorporated by reference.

BACKGROUND OF THE INVENTION

1. Field of the Invention

This invention relates generally to telecommunications. More particularly, it relates to wireless communication and devices, especially wireless devices capable of messaging (such as short messaging system (SMS) messaging, and multi-media system (MMS) messaging) and voice communication.

2. Background of Related Art

Conventional messaging technologies permit all parties (i.e. sender and recipient(s)) to a text message to specifically identify an originating party (e.g. device, web page, etc.) upon which the text message has been transmitted, and any recipient party (e.g. device, web page, etc.) upon which the text message is received. More particularly, conventional messaging technologies permit each party interacting via messaging to obtain identification credentials (e.g., IP addresses, Mobile Directory Numbers, etc.) for every other party interacting therewith.

However, there are a multitude of reasons a user may desire to transmit a text message anonymously. For instance, a user may wish to transmit a message containing an anonymous opinion/suggestion, and/or anonymously report or tip on a crime. Moreover, a user may wish to transmit an anonymous donation or charity, and/or send a message containing an anonymous complaint. Furthermore, a business may wish to send a message containing an anonymous reminder, advertisement, discount, etc.

Messages may currently be transmitted anonymously via conventional one way anonymous messaging services. Conventional one way anonymous messaging services are performed over conventional messaging technologies, to permit the identity of an originating party (e.g. device, web page, etc.) to remain unknown to a recipient party. A one way anonymous messaging service provides one way anonymity, by intercepting a message (e.g. SMS, MMS, email, etc.) following message transmission, and substituting an anonymous/fake source address for a real source address originally supplied therein.

Conventional one way anonymous messaging services exist for messages that are transmitted from the internet to a mobile device, e.g., http://www.anonymoussms.net and http://www.sendanonymoussms.com. Particular email programs (e.g. anonymous remailer software) provide conventional one way anonymous messaging services, as well.

Messages that are delivered via a one way anonymous messaging service contain an anonymous source address, to deny a recipient party the ability to identify an originating party. However, being that credentials (e.g., an IP address, an MDN, etc.) for an originating party are not supplied in a one way anonymous text message, messages are incapable of being transmitted in reply thereto. Hence, messages delivered via a one way anonymous messaging service may not receive message replies. Consequently, one way anonymous messaging services and methods serve only half the users, and at best solve only half the problem identified by the inventors herein. Moreover, conventional one way anonymous messaging services provide only a limited use case to support messaging from a web page to a mobile device.

Similar to conventional messaging technologies, conventional voice and video communication technologies permit all parties (i.e. sender and recipient(s)) to a voice and/or video call to specifically identify an originating party (e.g. device, web page, etc.) upon which the voice/video call has been initiated, and any recipient party (e.g. device, web page, etc.) upon which the voice/video call is received. More particularly, conventional voice/video communication technologies permit each party interacting via voice/video conversation to obtain identification credentials (e.g., IP addresses, Mobile Directory Numbers, etc.) for every other party interacting therewith.

Current anonymous voice/video communication methods enable end users participating in an on-line chat or similar text based session to engage in anonymous voice conversation via an online telephone company site/application (e.g. a call broker). All parties desiring to participate in an anonymous voice call must access the telephone company site/application and enter data requirements required for session setup. Once the online telephone company site/application receives requested data requirements from two or more parties desiring to engage in an anonymous voice call, the relevant telephone company completes voice links to those individual call participants and subsequently bridges those voice links together. Conventional anonymous voice communication patent technology is disclosed in U.S. Pat. No. 6,175,619.

Unfortunately, current anonymous voice/video communication technologies exclusively utilize Public Switched Telephone Network (PSTN) interconnectivity between calling parties.

SUMMARY OF THE INVENTION

In accordance with the principles of the present invention, an apparatus to anonymize at least two digital communication devices actively interacts in two-way digital packet communication with one another, comprises an anonymous digital communication module to form a digital packet gateway between the at least two actively interacting digital communication devices. The anonymous digital communication module anonymizes the active two-way digital packet communication by substituting an original source address in digital packets associated with the active interaction passing therethrough with an anonymous source address before forwarding the intercepted digital packet communication to an intended destination. Anonymity is maintained between the at least two digital communication devices vis-à-vis others of the at least two digital communication devices.

A method of providing full conversational anonymous messaging between two or more digital communication devices in accordance with another aspect of the invention comprises intercepting an anonymously addressed digital message transmitted between two or more digital communication devices. A real source address associated with the digital message is substituted with an anonymous source address, in the intercepted digital message. An anonymous destination address associated with the intercepted digital message is substituted in a destination address field of the intercepted digital message with a real destination address for the intended destination. The intercepted digital message is forwarded to the intended destination.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

The present inventorship has appreciated that in certain situations, it may be necessary or desired for two or more parties to interact conversationally via messaging (e.g. SMS, MMS, email, etc.), but to do so in a manner in which each party does not know the credentials (e.g. IP address, MDN, etc.) of any other interacting party. It has also appreciated that in certain situations, it may be necessary or desired for two or more parties to interact conversationally via voice/video communication (independent of any one communication medium), and to do so in a manner in which each interacting party does not know the identity (e.g. IP address, MDN, etc.) of any other interacting party.

In accordance with the principles of the present invention, a method and apparatus that permits two or more devices, user web pages, etc. to interact via conversational anonymous messaging and/or voice/video communication over a wireless/landline network, comprises an anonymous communication module. An anonymous communication module acts as a gateway/interconnect between all messaging mediums and all voice/video communication mediums, to permit anonymous messaging and/or voice/video communication between two or more parties interacting via an anonymous communication service. In particular, the anonymous communication module performs address substitution on messages and voice/video calls transmitted between two or more devices, user web pages, etc., to enable the address (e.g. mobile directory number, IP address, etc.) of each interacting end user to remain anonymous to all other interacting end users.

In accordance with the principles of the present invention, an internal address mapping database contains an internal address mapping for each device, user web page, etc. subscribed to the inventive anonymous communication service. An internal address mapping maps an anonymous address (e.g. a public address) to a real address (e.g. a private address) affiliated with a particular subscriber device, user web page, etc.

In accordance with the principles of the present invention, the anonymous communication module intercepts each message transmitted between two or more parties interacting via an inventive anonymous communication service. Following message intercept, the anonymous communication module queries the internal address mapping database to perform address substitution on the intercepted message. The anonymous messaging module then forwards the newly formatted message to an intended message destination.

In accordance with another aspect of the present invention, the anonymous communication module accepts an anonymous voice/video initiation message to an anonymous (i.e. public) destination address, as a trigger to start an anonymous conversation between the originator of the initiation message and parties affiliated with the anonymous destination address. An anonymous voice/video initiation message prompts a message recipient to initiate a voice/video call to a message originator via the anonymous communication service.

The first leg of an anonymous voice/video call is originated from the recipient of an anonymous voice/video initiation message, and terminated to the inventive anonymous communication module. In accordance with the principles of the present invention, the anonymous communication module queries the internal mapping database to perform address substitution on each anonymous voice/video call accepted thereon. Following address substitution, the anonymous messaging module initiates the termination leg of the anonymous voice/video call to an intended call recipient (i.e. the originator of the voice/video initiation message).

In accordance with the principles of the present invention, the anonymous communication module performs address substitution by substituting a real address located in the source field of an intercepted message and/or accepted voice/video call with a corresponding anonymous address, to deny a recipient party the ability to identify an originating party. In addition, the anonymous communication module substitutes an anonymous address in the destination field of an intercepted message and/or accepted voice/video call with a corresponding real address, to permit an originating party to transmit a message or initiate a voice/video call to a recipient party, without knowing a real (e.g. private) address for that particular recipient party.

The present invention provides full conversational anonymous messaging methods and apparatus to enable two or more individual wireless devices, individual user web pages, etc., to interact via messaging over a wireless/landline network, so that each interacting end user does not know the identity (e.g. mobile directory number, IP address, etc.) of any other interacting end user.

The present invention additionally provides a means for two or more parties to interact via an anonymous voice/video call, so that each party interacting via voice/video communication does not know the identity (e.g., IP addresses, Mobile Directory Numbers, etc.) of any other party interacting therewith.

In accordance with the principles of the present invention, conversational anonymous messaging and/or voice/video communication is achieved via an anonymous communication module. An anonymous communication module functions as a gateway between all messaging types and all voice/video communication mediums, to keep the address of each party interacting via messaging and/or voice/video communication anonymous to all other interacting parties.

In particular, an anonymous communication module intercepts a message (e.g. an SMS message, an MMS message, etc.) and/or accepts a voice/video call (e.g. VoIP/Video IP, wireless communication, PSTN, etc.) transmitted between two or more interacting devices, user web pages, etc. Following interception of a message and/or acceptance of a voice/video call, the anonymous communication module replaces the destination and origination address originally supplied in the intercepted message and/or accepted voice/video call, with system identifiers (e.g. anonymous/fake source addresses) or real addresses, as is appropriately determined. Address substitution performed by the anonymous communication module permits anonymous conversational messaging and/or voice/video communication, by providing a layer of isolation and abstraction amongst interacting parties.

Figure 1:
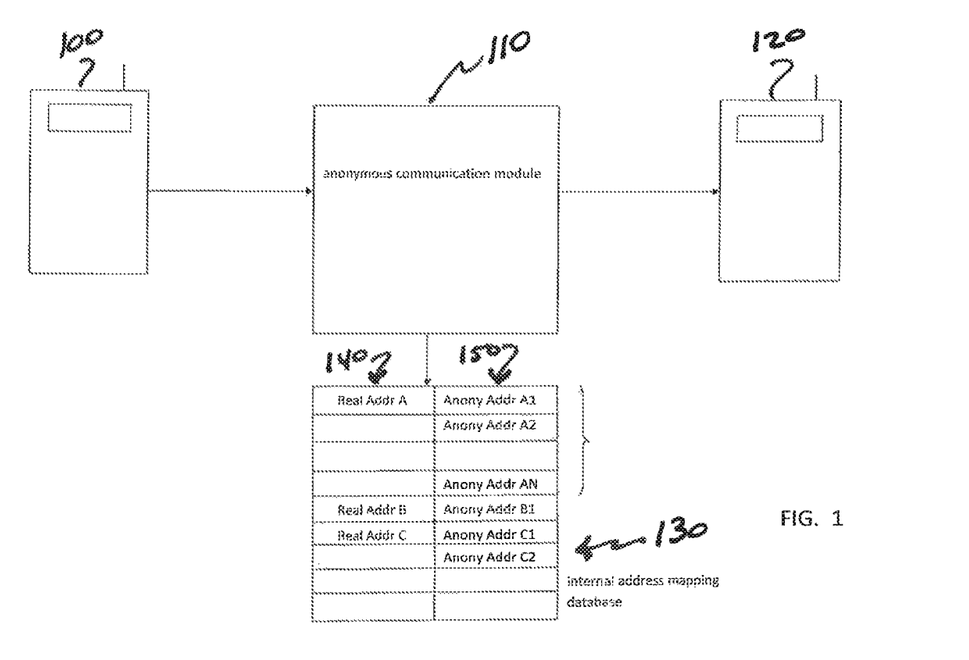
FIG. 1 depicts an exemplary network structure, in accordance with the principles of the present invention.

The anonymous communication module 110 performs address substitution on a message and/or voice/video call intercepted/accepted between two or more interacting parties, to permit the address of each interacting party to remain unknown to all other interacting parties. In particular, the anonymous communication module 110 substitutes a real address supplied in the source field of an intercepted message and/or accepted voice/video call, with a corresponding anonymous address, to deny a recipient party the ability to identify an originating party. In addition, the anonymous communication module 110 substitutes an anonymous address supplied in the destination field of an intercepted message and/or accepted voice/video call, with a corresponding real address, to permit an originating party to transmit a message or initiate a voice/video call to a recipient party, without knowing a real (e.g. private) address for that particular recipient party.

In accordance with the principles of the present invention, the anonymous communication module maintains an internal address mapping for each device, user web page, etc. interacting via an inventive anonymous communication service. An internal address mapping maps an anonymous address (e.g. a public address) to a real address (e.g. a private address) affiliated with a particular subscriber device. Internal address mappings are preferably maintained in an internal address mapping database.

FIG. 1 depicts an exemplary network structure, in accordance with the principles of the present invention.

As portrayed in FIG. 1, an anonymous communication module 110 intercepts messages and/or accepts voice/video calls that are transmitted between two or more devices, user web pages, etc., (100 and 120) via an anonymous communication service. In accordance with the principles of the present invention, the anonymous communication module 110 queries an internal address mapping database 130 to perform address substitution on each intercepted message and/or accepted voice/video call. The present invention 130 preferably maps one or more anonymous addresses 150 to each real address 140 subscribed to the anonymous communication service, to increase anonymity and/or support for multiple messaging and voice/video communication mediums.

Figure 2:
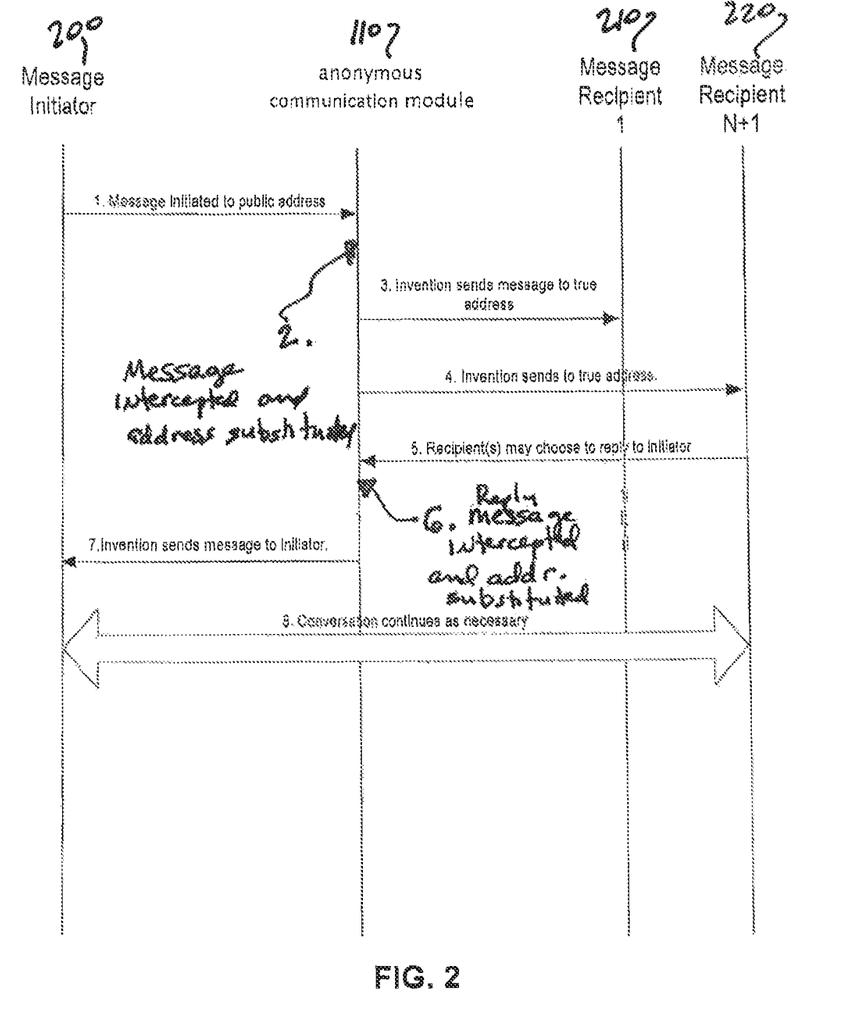
FIG. 2 shows exemplary functional flow of an anonymous messaging conversation, in accordance with the principles of the present invention.

FIG. 2 shows exemplary functional flow of an anonymous messaging conversation, in accordance with the principles of the present invention.

In particular, to initiate an anonymous messaging conversation, a message initiator 200 transmits a message to one or more anonymous (e.g. public) addresses via an anonymous communication service, as depicted in step 1.

An anonymous communication module 110 intercepts the transmitted message, and performs address substitution. The anonymous communication module 110 substitutes anonymous recipient address(es) supplied in the message destination field, with one or more true recipient addresses. Furthermore, the anonymous communication module 110 substitutes a real address (corresponding to message initiator 200) supplied in the message origination field, with an appropriate anonymous address.

In step 3, the anonymous communication module 110 forwards the newly formatted message to a first true recipient address (corresponding to message recipient 1 210).

In step 4, the anonymous communication module 110 forwards the newly formatted message to a second true recipient address (corresponding to message recipient N+1 220) (if applicable).

In step 5, a recipient party (210 or 220) transmits an anonymous reply message to the anonymous message received in step 3 (or 4). The anonymous reply message is destined to an anonymous source address supplied in the anonymous message received thereon.

An anonymous communication module 110 intercepts the anonymous reply message, and substitutes a true recipient address (corresponding to message initiator 200) for the anonymous recipient address indicated in the message destination field. In addition, the anonymous communication module 110 substitutes an anonymous source address for the real source address (corresponding to message recipient 210 or 220) supplied in the message origination field.

In step 7, the anonymous communication module 110 forwards the anonymous reply message to the true recipient address (corresponding to message initiator 200) retrieved in step 6.

In step 8, the anonymous messaging conversation continues as necessary.

The present invention supports the following two basic use cases to provide full conversational anonymous messaging: (1) Use Case Anonymous Message Initiation; and (2) Use Case Anonymous Message Reply.

Use Case Anonymous Message Initiation—this covers a case in which originating party A wants to transmit a message to recipient party B (e.g. a mobile device, web page, email service, etc.), but originating party A does not know a real (e.g. private) address for recipient party B. Recipient party B may be a member of a group, a dispatcher/operator, or simply a mobile device, web page, etc. with a real address that is not accessible to other mobile devices, web pages, etc.

In accordance with the principles of the present invention, originating party A transmits a message to recipient party B, by transmitting a message to an anonymous (e.g. publically known) destination address for recipient party B, via the anonymous communication service. The anonymous communication module 110 detects and intercepts the message transmitted by originating party A and extracts the anonymous address (for recipient party B) from the message destination field.

Using the anonymous address retrieved from the message destination field (for recipient party B), the anonymous communication module 110 queries an internal address mapping database 130, to identify a real (e.g. private) address mapped to that particular anonymous address. Upon identification, the anonymous communication module 110 substitutes the anonymous (e.g. public) address originally supplied in the message destination field (for recipient party B), with the corresponding real (e.g. private) address retrieved via the internal address mapping database.

The anonymous communication module 110 then substitutes a real address indicated in the message origination field (for originating party A), with an anonymous mathematically irreversible address selected/created for that particular real address. Lastly, the anonymous communication module 110 forwards the newly formatted message to the real (e.g. private) address identified for recipient party B.

Figure 3:
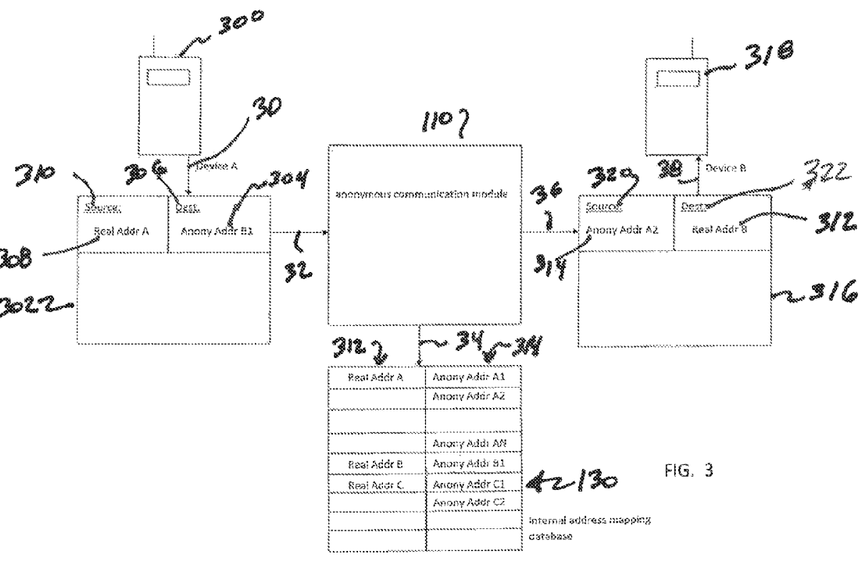
FIG. 3 depicts exemplary message intercept and address substitution performed on an anonymous message, in accordance with the principles of the present invention.

FIG. 3 depicts exemplary message intercept and address substitution performed on an anonymous message, in accordance with the principles of the present invention.

As shown in step 30, originating party A 300 transmits a message 302 (e.g. an SMS message, an MMS message, an email, etc.) to an anonymous (e.g. public) destination address 304 via the anonymous communication service. The transmitted message 302 contains an anonymous address 304 in the message destination field 306 and a real (e.g. private) address 308 (for originating party A 300) in the message origination field 310.

In step 32, the message 302 transmitted by originating party A 300 is intercepted via the anonymous communication module 110.

As shown in step 34, the anonymous communication module 110 performs two queries to an internal address mapping database 130. One query to the internal address mapping database 130 obtains a real address 312 mapped to the anonymous address 304 identified in the destination field 306 of the intercepted message 302. A second query to the internal address mapping database 130 obtains an anonymous address 314 mapped to the real address 308 (corresponding to party A 300) supplied in the origination field 310 of the intercepted message 302.

In step 36, the anonymous communication module 110 performs address substitution on the intercepted message 302, using addresses obtained via queries to the internal address mapping database 130 (step 34). The anonymous communication module 110 then forwards the newly formatted message 316 to an intended message destination 318, having a real address 312 in the message destination field 322 and an anonymous address 314 (corresponding to originating party A 300) in the message origination field 320.

In step 38, the anonymous message 316 is received on recipient party B 318.

Use Case Anonymous Message Reply—this covers a case in which a recipient party B wants to transmit an anonymous reply message to an anonymous message previously received on recipient party B. In accordance with the principles of the present invention, recipient party B transmits an anonymous reply message to a public/anonymous address identified in the source field of the anonymous message received thereon.

Following message transmission, the anonymous communication module 110 detects and intercepts the anonymous reply message transmitted by recipient party B, and extracts the anonymous destination address supplied in the message destination field.

Using the anonymous address retrieved from the message destination field, the anonymous communication module 110 queries an internal address mapping database 130 to identify a real (e.g. private) address mapped to that particular anonymous address. Upon identification, the anonymous communication module 110 substitutes the anonymous (e.g. public) address originally supplied in the message destination field, with the corresponding real (e.g. private) address retrieved via the internal address mapping database 130.

The anonymous communication module 110 then substitutes a real address (corresponding to recipient party B) indicated in the message origination field (for originating party B), with an anonymous mathematically irreversible address selected/created for that particular real address. Lastly, the anonymous communication module 110 forwards the newly formatted anonymous reply message to an intended message destination.

Figure 4:
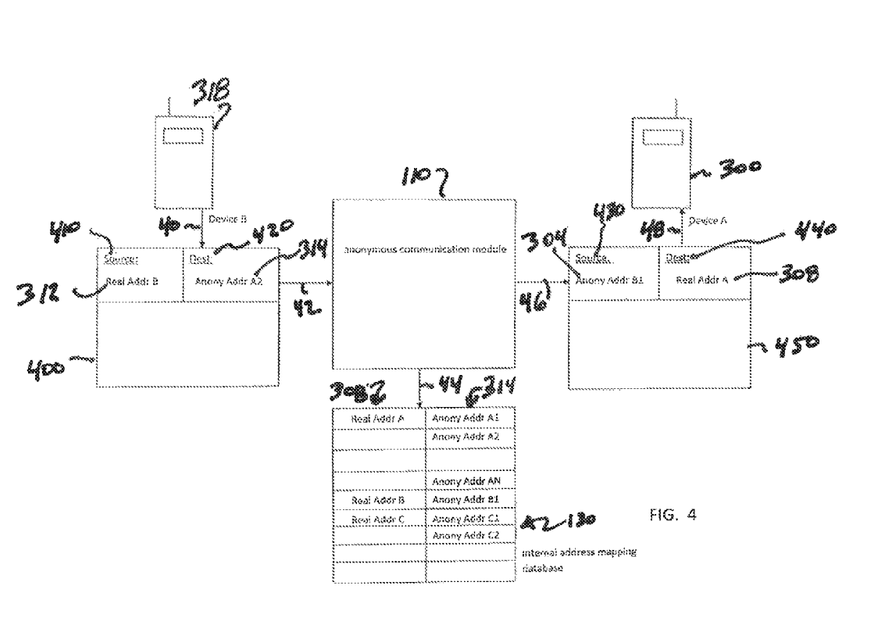
FIG. 4 depicts exemplary message intercept and address substitution performed on an anonymous reply message, in accordance with the principles of the present invention.

FIG. 4 depicts exemplary message intercept and address substitution performed on an anonymous reply message, in accordance with the principles of the present invention.

As shown in step 40, recipient party B 318 transmits an anonymous reply message 400 (e.g. an SMS message, an MMS message, an email, etc.) to an anonymous (e.g. public) source address 314 indicated in an anonymous message 316 (transmitted by originating party A 300) received thereon. The anonymous reply message 400 contains an anonymous address 314 (corresponding to originating party A 300) in the message destination field 420 and a real address 312 (for recipient party B 318) in the message origination field 410.

In step 42, the reply message 400 transmitted by recipient party B 318 is intercepted via the anonymous communication module 110.

In step 44, the anonymous communication module 110 performs two queries to an internal address mapping database 130. One query to the internal address mapping database 130 obtains a real address 308 mapped to the anonymous address 314 (corresponding to originating party A 300) identified in the destination field 420 of the intercepted reply message 400. A second query to the internal address mapping database 130 obtains an anonymous address 304 mapped to the real address 312 (corresponding to recipient party B 318) supplied in the origination field 410 of the intercepted reply message 400.

In step 46, the anonymous communication module 110 performs address substitution on the intercepted reply message using addresses obtained via queries to the internal address mapping database 130 (step 44). The anonymous communication module 110 then forwards the newly formatted reply message 450 to an intended message destination 300, having a real address 308 (corresponding to originating party A 300) in the message destination field 440 and an anonymous address 304 (corresponding to recipient party B 318) in the message origination field 430.

In step 48, the anonymous reply message 450 is received on originating party A 300.

In accordance with the principles of the present invention, the anonymous communication module additionally facilitates anonymous voice/video communication between two or more interacting devices, user web pages, groups, etc. In particular, the anonymous communication module 110 functions as a voice/video interconnect to enable two or more parties to participate in a fully anonymous voice/video conversation.

To initiate an anonymous voice/video conversation, an originating party sends an anonymous voice/video initiation message to an anonymous address affiliated with a desired recipient party. In accordance with the principles of the present invention, an anonymous voice/video initiation message is transmitted anonymously via the anonymous communication service. The anonymous communication module 110 intercepts an anonymous voice/video initiation message transmitted between two or more interacting parties (e.g. devices, user web pages, groups, etc.) and performs address substitution via methods previously described within the present disclosure. Following message intercept and address substitution, the anonymous communication module 110 forwards the anonymous voice/video initiation message to an intended message destination, via anonymous messaging methods and apparatus previously disclosed herein.

In accordance with the principles of the present invention, an anonymous voice/video initiation message triggers a message recipient to initiate an anonymous voice/video call to a message originator. In particular, a message recipient initiates an anonymous voice/video call to an anonymous address supplied in the source field of an anonymous voice/video initiation message received thereon. An anonymous voice/video call may be initiated via virtually any communication medium, including but not limited to the Internet, a public switched telephone network (PSTN), and/or a private IP network.

Figure 5:
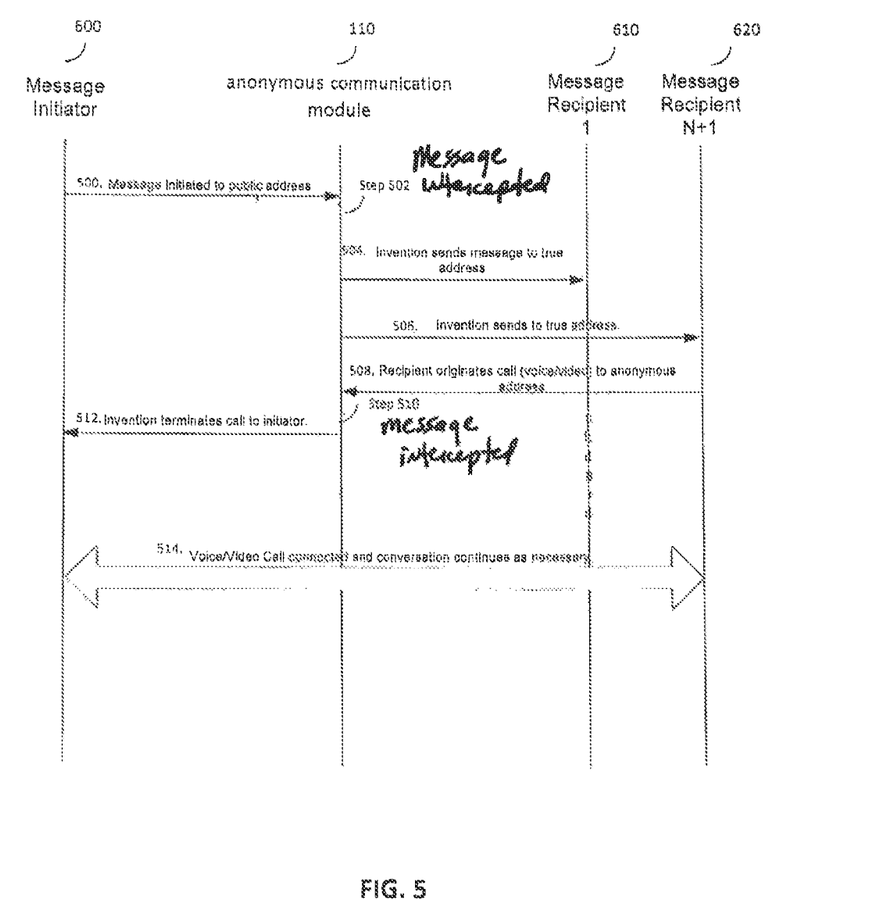
FIG. 5 shows exemplary functional flow of an anonymous voice/video conversation, in accordance with the principles of the present invention.

FIG. 5 shows exemplary functional flow of an anonymous voice/video conversation, in accordance with the principles of the present invention.

In particular, to initiate an anonymous voice/video conversation, a message initiator 600 transmits an anonymous voice/video initiation message to one or more anonymous (e.g. public) addresses via the anonymous communication service, as depicted in step 500.

In step 502, the anonymous communication module 110 intercepts the transmitted message, and performs address substitution. The anonymous communication module 110 substitutes anonymous recipient address(es) supplied in the message destination field, with one or more true recipient addresses. Furthermore, the anonymous communication module 110 substitutes a real address (corresponding to message initiator 600) supplied in the message origination field, with an affiliated anonymous address.

In step 504, the anonymous communication module 110 forwards the newly formatted anonymous voice/video initiation message to a first true recipient address (corresponding to message recipient 1 610).

In step 506, the anonymous communication module 110 forwards the newly formatted anonymous voice/video initiation message to a second true recipient address (corresponding to message recipient N+1 620). (if applicable).

In step 508, a recipient device initiates an anonymous voice/video call in response to the anonymous voice/video initiation message received in step 504 (or 506). The recipient party (610 or 620) originates the anonymous voice/video call to an anonymous address identified in the source field of the anonymous voice/video initiation message.

In step 510, the first leg of the anonymous voice/video call is terminated to the anonymous communication module 110. The anonymous communication module 110 accepts the voice/video call and substitutes a true recipient address (corresponding to message initiator 600) for the anonymous recipient address indicated in the call destination field. In addition, the anonymous communication module 110 substitutes an anonymous source address for the real source address (corresponding to message recipient 610 or 620) supplied in the call origination field.

In step 512, the anonymous communication module 110 initiates the termination leg of the anonymous voice/video call to the true recipient address (corresponding to message initiator 600) retrieved in step 510.

In step 514, the anonymous communication module 110 permits voice/video communication to commence between message originator 600 and message recipient (610 or 620), without revealing true caller ID characteristics to either party.

In an additional embodiment, to facilitate call termination to a party that does not accept calls from blocked numbers, an anonymous communication module 110 may use an originating party's anonymous (i.e. public) address to satisfy caller ID requirements.

In accordance with the principles of the present invention, a device, web page, etc. must register with the inventive anonymous communication service to receive anonymous messages and/or voice/video services. However, a device, web page, etc., that is registered to the anonymous communication service is not required to initiate any anonymous messages and/or voice/video calls.

Moreover, although it is necessary that a device register with the anonymous communication service to RECEIVE anonymous messages and/or voice/video calls, a party is not required to register with the anonymous communication service to INITIATE any anonymous messages and/or voice/video calls. When a party that is not registered to the anonymous communication service transmits an anonymous message and/or initiates an anonymous voice/video call to a party that is registered to the anonymous communication service, the anonymous communication module 110 creates a unique address mapping for that particular initiating party, and permits the message and/or voice/video call to be carried out anonymously.

During registration to the anonymous communication service, a party (e.g. a device, web page, etc.) preferably defines messaging mediums and/or voice/video mediums over which that particular party may receive messages and voice/video calls. A party additionally specifies preferred messaging types, preferred priority and/or timing configurations, and/or any other service configurations preferred during service registration. Preferences specified during service registration help the anonymous communication module 110 determine a real termination address from an anonymous termination address.

Once a party (e.g. device, web page, etc.) has registered to the anonymous communication service, that party (e.g. device, web page, etc.) preferably registers with a new publically known address (i.e. an anonymous address), and/or a publically known address selected from a list of known groups, depending upon the default messaging and/or voice/video communication medium.

In accordance with the principles of the present invention, an anonymous address is created or selected for an originating device via processing methods that are independent of that device's real address. Hence, it is not possible to mathematically derive a real address from an anonymous address that is mapped thereto. Consequently, the present invention is not vulnerable to man-in-the-middle attacks and/or any $3^{rd}$ party observational attempts to decipher a real address from an anonymous address (e.g. a public address).

For each messaging medium supported, the invention preferable maintains a pool of valid addresses, publicly routed and terminated to the invention. An anonymous communication module 110 preferably supports multiple means for creating or selecting an anonymous address to map to a real address:

Firstly, the anonymous communication module 110 may select a first available address from an anonymous address pool, and increment a pointer to a next available address in the pool following each individual address selection.

Secondly, the anonymous communication module 110 may utilize unique messaging characteristics (excluding a source address), such as time/date of message transmission, messaging medium used, and/or any combination thereof, to mathematically select or create an anonymous address for use.

Lastly, depending upon service configuration and messaging medium used, the anonymous communication module 110 may assign a fixed anonymous address to a particular real address.

The present invention provides anonymity between parties, as well as enabling message conversations when the other party is not known in quantity or types.

The present invention permits conversational anonymous messaging to be performed between two or more devices, web pages, etc., interacting across virtually any messaging medium.

The present invention is applicable but not limited to the following messaging services: short message services, web page messaging services, email, multimedia messaging services, instant messenger services, etc.

The present invention has particular applicability to governments, government agencies, GAOs, local and regional governments, anonymous 'tipster' type services that help to solicit citizens' fight against crime and corruption, etc.

While the invention has been described with reference to the exemplary embodiments thereof, those skilled in the art will be able to make various modifications to the described embodiments of the invention without departing from the true spirit and scope of the invention.

What is claimed is:

1. Apparatus to anonymize at least two individual user web actively interacting in two-way digital packet communication with one another, comprising:
   an anonymous digital communication module to form a digital packet gateway between an unregistered sender device and a registered recipient device of said at least two actively interacting digital communication devices, said anonymous digital communication module anonymizing said active two-way digital packet communication in real time, before delivery is completed to an anonymous addressed recipient user web page associated with said registered recipient device, by intercepting said active two-way digital packet communication and substituting for a real address associated with said unregistered sender device in source fields of digital packets associated with said active interaction passing therethrough with an anonymous address associated with said unregistered sender device, and substituting for an anonymous address associated with said registered recipient device in destination fields of digital packets associated with said active interaction passing therethrough with an affiliated real address associated with said registered recipient device, before said intercepted digital packet communication reaches its addressed destination;
   wherein anonymity is maintained between said at least two individual user web pages vis-a-vis each other.

2. The apparatus to anonymize at least two individual user web pages actively interacting in two-way digital packet communication with one another according to claim 1, wherein said real address comprises:
   a mobile directory number.

3. The apparatus to anonymize at least two individual user web pages actively interacting in two-way digital packet communication with one another according to claim 1, wherein said real address comprises:
   an Internet Protocol (IP) address.

4. The apparatus to anonymize at least two individual user web pages actively interacting in two-way digital packet communication with one another according to claim 1, wherein said digital packet communication comprises:
   Voice over Internet Protocol (VoIP).

5. The apparatus to anonymize at least two individual user web pages actively interacting in two-way digital packet communication with one another according to claim 1, wherein said digital packet communication comprises:
   a short message.

6. The apparatus to anonymize at least two individual user web pages actively interacting in two-way digital packet communication with one another according to claim 1, wherein said digital packet communication comprises:
   a multimedia message (MMS).

7. The apparatus to anonymize at least two individual user web pages actively interacting in two-way digital packet communication with one another according to claim 1, wherein said digital packet communication comprises:
   an instant message (IM).

8. The apparatus to anonymize at least two individual user web pages actively interacting in two-way digital packet communication with one another according to claim 1, further comprising:
   an internal address mapping database to affiliate real addresses to at least one anonymous address, for each of said at least two individual user web pages.

9. The apparatus to anonymize at least two individual user web pages actively interacting in two-way digital packet communication with one another according to claim 8, wherein:
   said anonymous digital communication module intercepts said digital packet communication corresponding to said active two-way digital packet communication; queries said internal address mapping database to determine said anonymous source address to substitute in for said real source address supplied in said digital packet communication, queries said internal address mapping database to determine said real destination address to substitute in for said anonymous destination address supplied in said digital packet communication, and routes a newly, anonymously-addressed digital packet communication to an intended destination individual user web page.

10. The apparatus to anonymize at least two individual user web pages actively interacting in two-way digital packet communication with one another according to claim 1, wherein said anonymous digital communication module mathematically selects said anonymous address based on time of communication, date of communication, and type of communication.

11. The apparatus to anonymize at least two individual user web pages actively interacting in two-way digital packet communication with one another according to claim 1, wherein said unregistered sender device engages in said active two-way digital packet communication in the absence of personal information uniquely identifying a user of said unregistered sender device, such that anonymity is maintained between said user of said unregistered sender device and said anonymous digital communication module.

12. A method of providing full conversational anonymous digital communication between two or more individual user web pages, comprising:
   intercepting, in real time, before delivery is completed to an addressed one of a plurality of individual user web pages, an anonymously addressed digital packet transmitted from a first unregistered individual user web page of said plurality of individual user web pages;
   substituting for a real source address associated with said digital packet with an anonymous source address, in said intercepted digital packet;
   substituting for an anonymous destination address associated with said intercepted digital packet in a destination address field of said intercepted digital packet with a real destination address for an intended destination of a registered second individual user web page;
   routing said intercepted digital packet to said real destination address associated with said registered second individual user web page.

13. The method of providing full conversational anonymous digital communication between two or more individual user web pages according to claim 12, further comprising:
  querying an internal address mapping database to affiliate said real destination address with said anonymous destination address; and
  querying said internal address mapping database to affiliate said real source address with said anonymous source address.

* * * * *